Aug. 29, 1967    H. B. FEHLMANN    3,338,412
METHOD AND DEVICE FOR THICKENING WET SLUDGE
Filed Nov. 21, 1963    4 Sheets-Sheet 1

INVENTOR
Hans Beat Fehlmann
BY
ATTORNEYS

Aug. 29, 1967  H. B. FEHLMANN  3,338,412
METHOD AND DEVICE FOR THICKENING WET SLUDGE
Filed Nov. 21, 1963  4 Sheets-Sheet 2
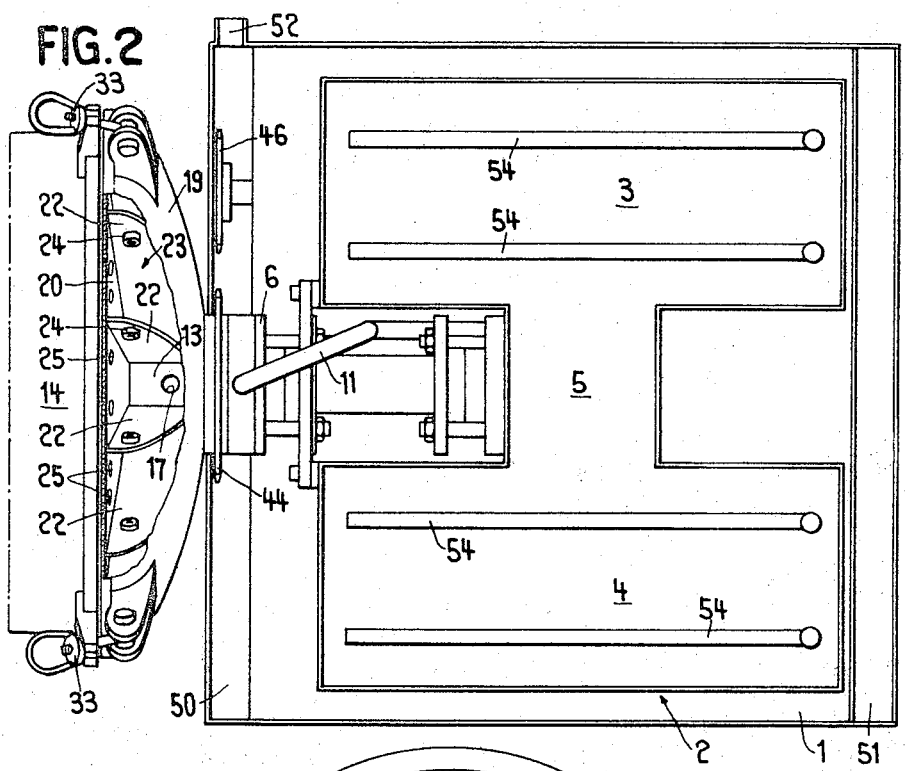
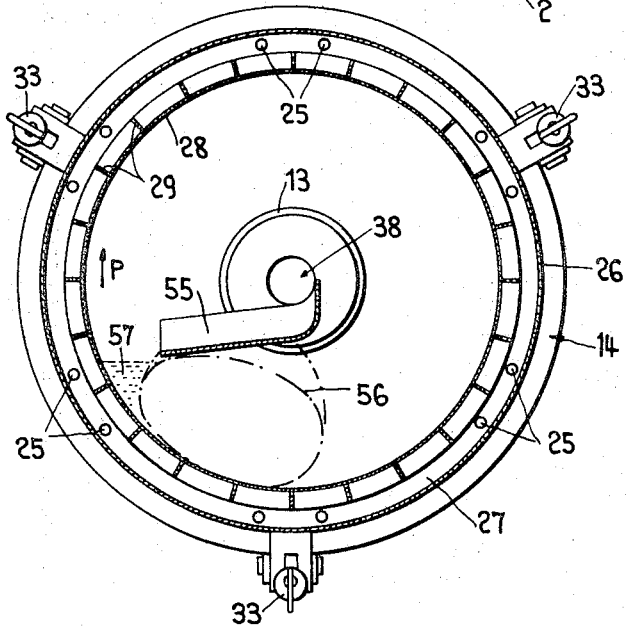
INVENTOR
Hans Beat Fehlmann
BY
*Emrich & Smiley*
ATTORNEYS Aug. 29, 1967   H. B. FEHLMANN   3,338,412
METHOD AND DEVICE FOR THICKENING WET SLUDGE
Filed Nov. 21, 1963   4 Sheets-Sheet 3

INVENTOR
Hans Beat Fehlmann
BY
*Imirie & Smiley*
ATTORNEYS

Aug. 29, 1967  H. B. FEHLMANN  3,338,412
METHOD AND DEVICE FOR THICKENING WET SLUDGE
Filed Nov. 21, 1963  4 Sheets-Sheet 4

INVENTOR
Hans Beat Fehlmann
BY
*Emirie + Smiley*
ATTORNEYS

United States Patent Office 3,338,412
Patented Aug. 29, 1967

3,338,412
METHOD AND DEVICE FOR THICKENING WET SLUDGE
Hans Beat Fehlmann, Klausstrasse 43,
Zurich 34, Switzerland
Filed Nov. 21, 1963, Ser. No. 325,410
Claims priority, application Switzerland, July 31, 1963, 9,511/63
11 Claims. (Cl. 210—77)

This invention relates to a method and a device for thickening or concentrating wet sludge.

In an endeavour to remove and, as far as possible, make use of city sewage and industrial sludge, the wet sludge is often concentrated or thickened by extraction of water in order to obtain a dry sludge. However, substantial difficulties are encountered particularly due to the high variety of sludges to be treated.

Vacuum filters have already been proposed for extraction of the sludge water, but the costs of this procedure are very high compared with the effect. It is particularly difficult to remove the more or less concentrated sludge from the filter surfaces, because the wear of the filter elements is considerable and such elements must often be replaced. Shut-down of the plant and the presence of qualified staff is required. The use of steam or pressure air for throwing the thickened or dried sludge off the filter elements has not brought a substantial improvement over the plants wherein the concentrated sludge is scraped off the filter elements.

In another known device a cylindrical filter element is supported on two axially spaced rings, such rings being rotatably mounted on supporting rollers so that the cylindrical filter element may be rotated about its horizontal axis. If a suitable sludge is applied at the lower portion of the filter element, a sludge roll will be formed due to the rotation of the filter element, this sludge roll rotating in a pool of wet sludge. It is assumed that due to mutual attraction between masses more and more particles adhere to the sludge roll and the water is drained through the filter element due to gravity. However, as mentioned above, this prior device is only suitable for thickening sludges suitable for forming a sludge roll without further treatment. This may be the case for fresh sludge, for instance city sewerage sludge and some industrial sludges. Another drawback of this prior device resides in the fact that the sludge roll always rolls off in the said pool of wet sludge whereby the roll contains and absorbs too much water if the water flows off slowly and if the level of the pool exceeds a relatively low limit. Due to the high contents of water the sludge roll becomes slimy so that it will no longer roll off properly on the filter element and the latter is smeared over and clogged. In order to avoid these difficulties paper chips or saw dust were added to the sludge in order to improve the water absorption by the sludge roll, but this procedure increases the volumes to be handled and the costs, and reduces the efficiency of the method. Further, the device had to be shut down for adding the said materials, and proper dosing of the materials involved was extremely difficult and with respect to the size of the pool of wet sludge practically impossible. Moreover, only a small portion of the relatively large filter surface having a diameter in the order of 1 meter or more is active for dehydrating the sludge, so that the relation between the machine costs and the capacity of the device is particularly unfavourable.

It is an object of this invention to overcome the above difficulties and drawbacks of prior devices. The method according to this invention broadly comprises applying a layer of wet sludge to one side of a filter means, producing an underpressure or a partial vacuum at the other side of said filter means, and moving said filter means for feeding said layer to a sludge roll rolling on said filter means. Under these conditions it is possible to obtain a water extraction from the sludge practically on the whole filter surface, and by proper adjustment of the sludge dosing, the speed of the filter means, the partial vacuum and other conditions the sludge may be fed to the sludge roll in a condition particularly suitable for forming a sludge roll, and for self-cleaning the filter surface without the use of any auxiliary materials.

It is a further object of this invention to provide a device for carrying out the above novel method, this device comprising broadly a filter means, at least one recessed displaceable portion being formed in said filter means adapted to take up a sludge roll, means for applying wet sludge to said filter means at a distance in front of the sludge roll with respect to the rolling direction of the latter, means for producing an underpressure or a partial vacuum on the side of the filter means opposite to the said means for applying wet sludge, and outlet means for the thickened sludge near at least one end of the said recessed portions adapted to take up a sludge roll.

Two forms of the method and two embodiments of the device according to this invention will now be explained in detail and by way of example with reference to the attached drawings wherein:

FIG. 2 is a top view of the first embodiment, partially in section,

FIG. 3 is a front view of the drum of the first embodiment,

Figure 1:
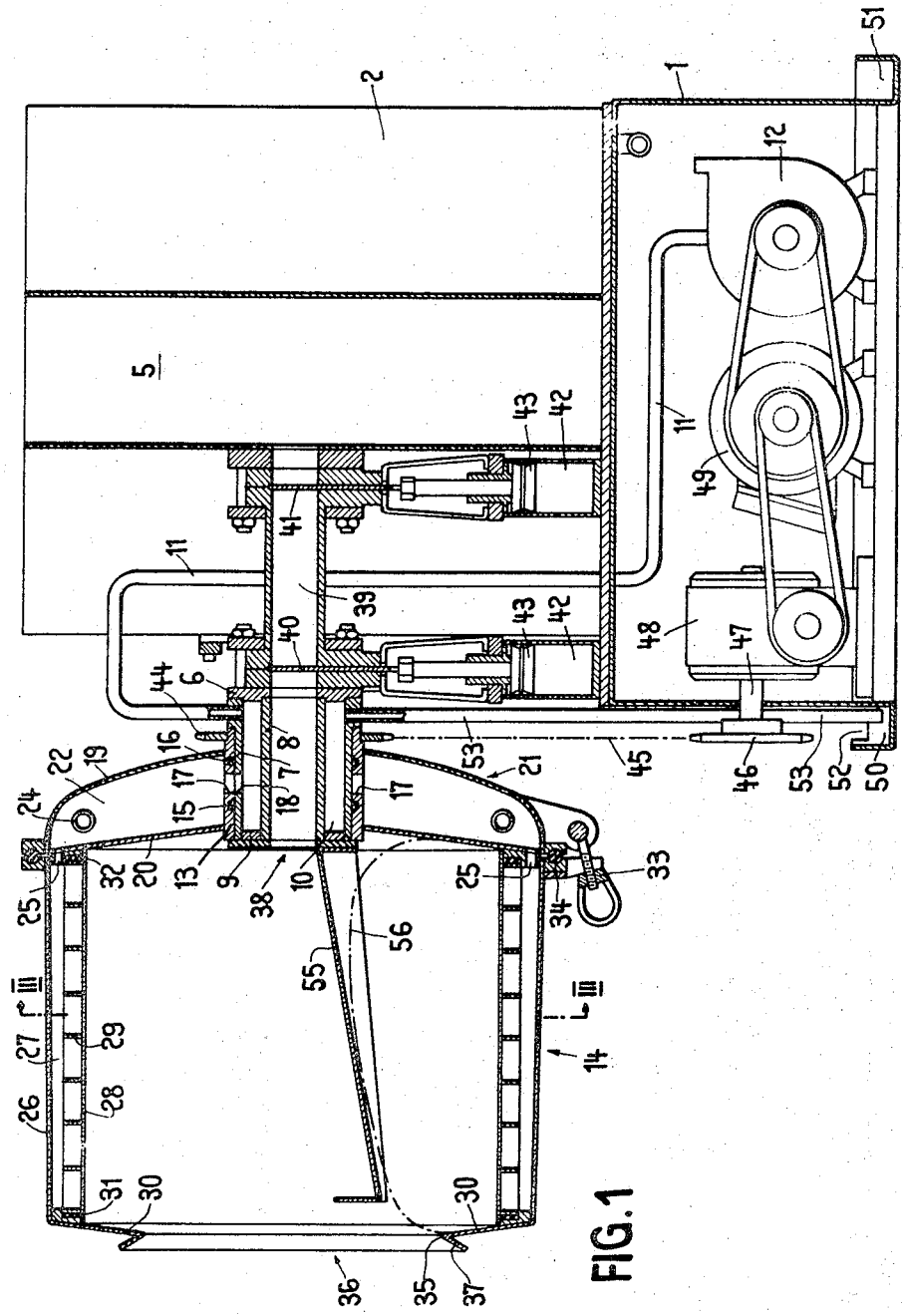
FIG. 1 shows the first embodiment in longitudinal section.
Figure 4:
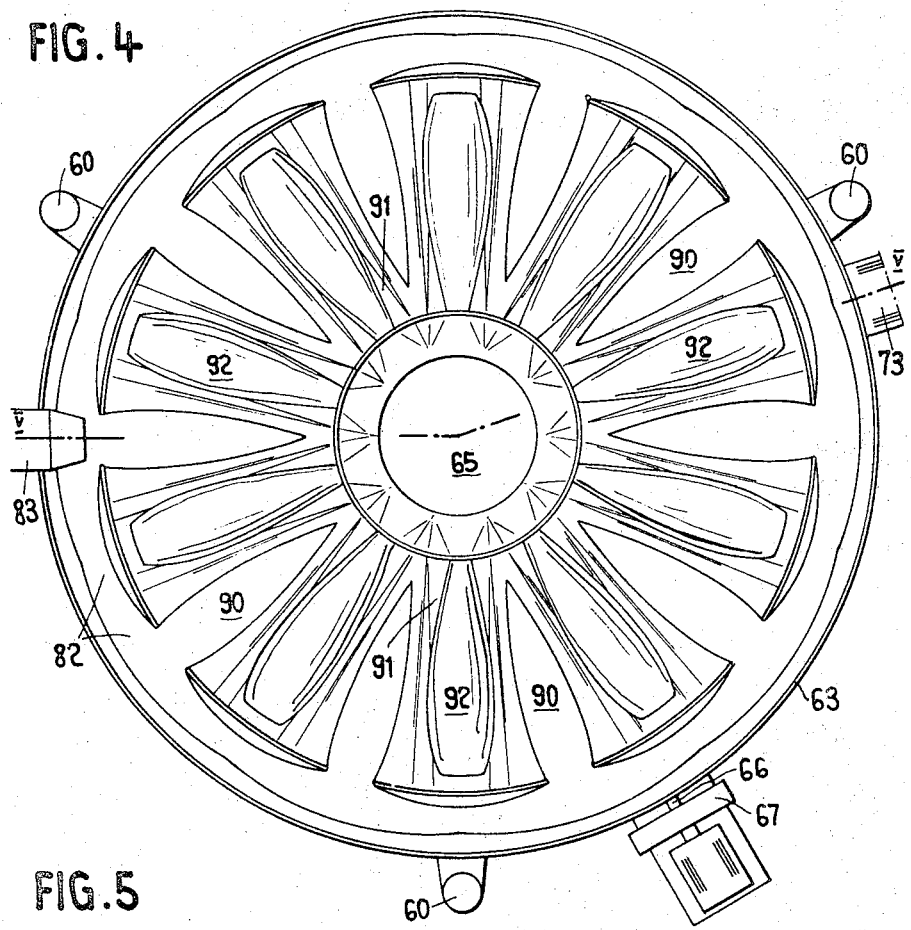
FIG. 4 is a top view of the second embodiment.

The first embodiment shown in FIGS. 1 to 3 has a base 1 carrying a tank 2 of I-shaped cross section (FIG. 2) with two parallel compartments 3 and 4 interconnected by a canal 5.

A flange 6 attached to the tank forms a support for two coaxial tubes 7 and 8 tightly interconnected at their free ends by means of an annular end wall 9 so that the space 10 enclosed by tubes 7 and 8 the flange 6 and the end wall 9 is hermetically sealed. The annular space 10 communicates with a tube 11 having a vertically rising portion on top of the annular space 10, the other end of tube 11 being connected to the suction pipe of a fan 12 or any other suitable means for producing a partial vacuum.

The tube 7 forms the pivot shaft for a hub 13 of a drum 14, the gap between tube 7 and hub 13 being hermetically sealed by means of sealing rings 15 and 16. Six radial apertures 17 of the hub 13 are provided in the same radial plane with a radial bore 18 in the upper portion of tube 7, so that each of the apertures 17 will successively communicate with the bore 18 upon rotation of the hub 13 on tube 7.

A drum bottom 21 comprising an outer wall 19 and an inner wall 20 is connected to the hub 13, whereby the walls 19 and 20 are hermetically connected to each other and to the hub 13. The annular space formed between walls 19 and 20 and hub 13 is subdivided into six chambers 23 by means of radial separating walls 22. Adjacent chambers are interconnected by means of tubes 24 projecting at each side from the separating wall. The separating walls 22 are disposed between each two apertures 17 of the hub 13 so that each chamber 23 communicates with one aperture 17. The inner wall 20 of the drum bottom 21 has pairs of apertures 25 interconnecting one of the chambers 23 with an annular hollow space 27 formed inside the mantle 26 of the drum 14. The inner delimitation of the annular space 27 is formed by a filter cloth 28 supported by a supporting ring 29 formed of honeycomb ribs and clamped between the drum bottom 21 and the opposite end wall 30 of the drum. Sealing rings 31 and 32 are applied to the end faces of ring 29. The mantle 26 and the bottom 21 of the drum are interconnected by means of a rapidly operable closure comprising articulated screws 33 so that the filter unit 28–29 may rapidly be removed from the drum for replacing the filter cloth. This operation is very simple and may be executed by unqualified staff. The joint between the drum mantle 26 and the drum bottom 21 is sealed by means of an O-ring 34.

The inner wall 20 of the drum bottom 21 and the end wall 30 of the drum 14 are conically shaped. The drum mantle 26 is slightly widened conically from the end wall 30 towards the wall 20. The end wall 30 has a central opening 36 formed by a sharp edge 35, the opening being further surrounded by a collar 37 conically widening outwardly.

The open end of tube 8 forms the outlet opening 38 of a sludge canal 39 connecting the sludge tank 2 with the drum 14. The sludge flow through this cannal 39 is controlled by means of two regulating sliders 40 and 41 guided for vertical displacement and actuated each by a piston 43 displaceable in a cylinder 42. The sliders 40 and 41 shown in their closed position may be retracted from the canal 39 by the cylinders and may subsequently be returned to closed position. The pressure medium admitted to cylinders 42, for instance a liquid or air is so controlled by valve means not shown in the drawing, that the sliders are alternatively closed and opened in a predetermined, adjustable sequence. This sequence and the rotating speed of the drum must be adjusted to each other in accordance with the characteristics of the sludge. Of course the sliders 40 and 41 may be replaced by equivalent control means, for instance rotating sliders or valves driven in synchronism with the drum.

The drum is driven from a motor 49 through a variable transmission 48, the shaft 47 of the latter, a chain wheel 46, a chain 45 and a chain wheel 44 fixed on hub 13. The fan 12 is also driven by motor 49. A gutter 50, 51 with an outlet 52 (FIGS. 1 and 2) is formed round the lower end of the base 1. A vertical water drainage pipe 53 connected to the lower portion of the space 10 dips into the gutter portion 50.

The wet sludge to be thickened is filled into the tank 2 from where it flows through the canal in accordance with the dosing effected by sliders 40 and 41. Due to the particular form of the tank described above the sludge is circulated in the tank so that sedimentation of heavy particles of the sludge and partial thickening of the sludge in the tank are avoided. For the same purpose air admission pipes 54 (FIG. 2) may be provided for mixing the tank contents by air admitted thereto. Whenever required the tubes 54 may be used for admitting auxiliary materials such as chemicals into the sludge tank.

The wet sludge leaving the outlet opening 38 of the canal 39 is admitted onto a guide sheet 55 having a slight inclination towards the open end of the drum and towards the ascending side of the drum rotating in the direction of arrow P in FIG. 3. Soon after starting up the device, the partially dewatered layer of sludge in the lower part of the ascending portion of the drum has a consistency such that it easily separates from the drum, and the upper portions of the sludge layer fall back along the ascending side of the drum onto the lower portions of the layer thereby forming an accumulation of sludge which soon forms a roller 56 rotating on the ascending side of the drum. The position of the roller in the drum is relatively well determined because it always rolls back to the position illustrated whenever it is slightly lifted along the ascending side of the drum. The wet sludge admitted to the drum falls into the wedge-shaped space formed between the filter surface of the drum and the sludge roll above the latter. A pool 57 of wet sludge is formed in the said wedge-shaped space, a thin layer of wet sludge adhering to the rotating filter cloth 28 during rotation of the drum on the full axial length of the drum so that the upper portion of the filtering surface between the pool 57 and the lower end of the roll 56 is completely covered with a thin layer of sludge. Since the ring space 27 of the drum mantle is periodically connected to the suction pipe of fan 12 through apertures 25, a chamber 23, apertures 17 and 18 whenever such apertures communicate with each other and pipe 11, a substantially constant partial vacuum or underpressure is produced outside the filter cloth 28 whereby a good adherence of the sludge to the inside surface of the filter cloth and a substantial improvement of the water extraction from the sludge is obtained. Preferably relatively low pressures are used which may be produced by a simple fan, whereby relatively high air volumes may be sucked in at relatively low power consumption of the vacuum source. Under these conditions the relation between the power consumption and the water extraction is particularly favourable. The dosing of the wet sludge, the partial vacuum and the speed of the drum are coordinated and adjusted to the kind of sludge to be treated so that the thin layer of sludge has been thickened to such an extent when entering below the sludge roll that a compact roll is formed and that the sludge layer is entirely taken up by the sludge roll from the filter cloth.

Due to the slightly outwardly tapered shape of the drum 14 and particularly to the conical shape of the end walls 20 and 30 of the drum the sludge roll of increasing size is continuously consolidated and the remaining water contents is further reduced by the squeezing effect of the sludge roll. Moreover the sludge roll 56 adsorbs material directly from the pool 57 because particles contained in this pool adhere to the sludge roll due to mass attraction. When the sludge roll reaches a predetermined size the thickened sludge starts to fall or flow off through opening 36 over the edge 35 from the adjacent end of the sludge roll, whereby the collar 37 avoids smearing of the outer surface of the end wall 30.

Water flowing through the filter cloth 28 and collecting in the annular space 27 will flow towards the drum bottom due to the slightly conical form of drum 14, whereafter the water flows through the lowermost bores 25 of wall 20 into the lowermost chamber 23. Upon further rotation of the lowermost chamber the water contained therein is lifted with the chamber because the water contained therein is lifted with the chamber because the water cannot flow over into the next chamber due to the projecting ends of tubes 24. Only when the chamber has reached its uppermost position the water will flow off through communicating apertures 17 and 18 into the ring space 10 from where the water flows through the pipe 53 into the gutter 50 and through the outlet 52 thereof. As shown in FIG. 3 the level of the outlet 52 is above the lower end of the drainage pipe 53 so that this lower end usually dips into the water and consequently no air can be aspired through pipe 53 by the vacuum produced in the space 10. Due to the ascending portion of the vacuum pipe above an annular space 10 water cannot possibly flow to the fan.

Comparing the operation and conditions of the device described above with the prior art mentioned above, the following essential differences are observed:

In the prior device the pool of wet sldge is formed below the sludge roll so that the roll rotates directly in the pool and continuously takes up a high amount of water from the pool, and therefore has a high water content. The filter cloth is only effective within reach of the sludge roll and the sludge pool respectively. In accordance with this invention, the sludge pool is formed above the sludge roll and downstream the sludge roll relatively to the rotating direction of the drum, whereby practically no water but only solid particles are taken up by the sludge roll from the sludge pool. The sludge is continuously fed to the sludge pool and a thin layer of sludge adhering to the filter cloth is continuously pulled out of the pool, the layer being thickened during its rotation with the drum and then wound onto the sludge roll. The water contents of the sludge roll is further reduced by squeezing and the concentrated sludge automatically and continuously flows off the drum. It is not necessary to shut down the plant unless the filter cloth must be replaced. However, this necessity obviously arises relatively seldom because the filter cloth is not subjected to wear. The thickened sludge layer is not scraped off the filter cloth or otherwise removed by mechanical means or by means of pressure air but is wound onto the sludge roll.

Since the speed of the drum and the sequence control of the sliders 40 and 41 are independently and continuously adjustable the device may be adjusted to the particular conditions of any desired wet sludge. In any case a high degree of dehydration may be obtained with a continuous and automatic operation, the water contents of the thickened sludge being lower than the water contents obtained with prior larger and more expensive installations, which could not always be used for all kinds of sludges. These advantages of the device according to this invention are not only due to the fact that the full filter surface is effective and that the water extraction is not only obtained by the rotation of a sludge roll, but the efficiency of the device may further be improved by increasing the drum speed, this being possible because the sludge roll does not roll off in a sludge pool. The inertia of the sludge roll does not limit the speed of the drum because the sludge roll is not only driven by the filter cloth but also by the conical end walls of the drum.

Since there is no sludge pool below the sludge roll it is not possible that particles contained in the sludge pool are pressed and smeared onto the filter cloth. Particles contained in the pool 57 above the sludge roll will only loosely adhere to the sludge roll by mass attraction and are not pressed directly against the filter cloth but are enclosed between the roll surface and the partially dehydrated sludge layer wound onto the sludge roll. In spite of the increased speed the filter cloth is never smeared but the particles adsorbed directly from the sludge pool are properly incorporated into the sludge roll.

Due to the partial vacuum an efficient water extraction is obtained even when fine-mesh filter cloth is used.

The continuous operation of the device, the minimum attendance, the high versatility for treating sludges of different quality and obtaining a wide variety of desired concentrations of the thickened sludge, the possibility of providing small drums and filter units which may be manufactured in series production and the possibility of substantially reducing the costs of operation without any auxiliary filter material such as lime, ashes, slag, stone powder, kieselguhr, saw dust or the like are the most important advantages of the invention. Another advantage is the light construction of the device which has, however sufficient stability when its tank is filled with sludge.

A second drum may be provided in a position symmetrically opposite to the drum shown in the drawings due to the symmetrical shape of the tank. A number of drums may be disposed side by side and/or on top of each other, it being possible to admit wet sludge into such drums from one single common tank or from a combined multiple tank.

This invention is not limited to the use of a drum as shown in FIGS. 1–3. As an example an endless band of filter cloth may be advanced on supporting rollers or other supporting means in such a manner that at least one recessed portion of the filter cloth is formed wherein a sludge roll is produced, and whereby a partial vacuum may be produced on the rear side of the filter cloth. While in the specification and in the claims an underpressure is said to be produced at the rear side of the filter means, this underpressure may be obtained by increasing the pressure at the side of the filter means receiving the sludge, it being only important that a pressure drop in the direction of the water flow through the filter means is produced.

An embodiment of the device without a rotating drum is shown, by way of example, in FIGS. 4–9. This embodiment is based on a principle substantially differing from the one explained above, in that a wave-like propagating deformation of the filter means is produced whereby wet sludge is applied to the filter means in at least one recessed portion thereof and a sludge roll is formed in at least one other recessed portion of the filter means, there being no direct communication between said recessed portions.

A particularly important feature is the complete separation of the sludge rolls and the pools of wet sludge.

With this method an improved self-cleaning effect of the filter cloth is obtained due to the continuous deformation and fulling of the filter cloth, and the construction of the device may be simplified substantially. The device shown in FIGS. 4 to 9 has a casing 61 supported on columns 60 and forming an annular tray 62. The outer rim 63 of the opening of the casing 61 is at a substantially higher level than the inner rim 64. The vertical canal 65 of circular cross section formed by the inner wall of the casing 61 is the sludge outlet. The tray 62 communicates with the suction pipe 66 of a fan 67 so that a partial vacuum may be produced in the casing 61. The tray 62 also communicates with a water drainage pipe 68 having a siphon 69.

Three pedestals 70 are fixed at the bottom of the casing 61 spaced by 120°, two shafts 71 are pivoted on each pedestal and another cylinder 72 is supported by each pair of shafts 71. The cylinder 72 shown on the right in FIG. 5 may be driven through a speed reduction gear from a motor 73. The cylinders 72 engage a groove 74 of an annular tray-shaped supporting structure 75 disposed concentrically within the casing 61 and having a perforated bottom wall 76. Guide rails 79 of U-shaped profile allowing insertion of slides 80 of synthetic resin or the like are provided at the upper rims of the vertical side walls or supporting ribs 77 and 78 of the support 75. As illustrated by the partial developments of FIGS. 6 and 7 the upper rims of the supporting ribs 77 and 78 are corrugated or wave-shaped.

A filter means or filter cloth of a fine-mesh sheet material of high flexibility and tensile strength, such as a nylon fabric or net, a wire net of stainless steel or the like is fixedly attached to the upper rims 63 and 64 of casing 61 and is sewn to the sliders 80. The filter cloth is so attached to the rims of side walls 63 and 64 and to the slides 80 that it sags appreciably between the outer rim 63 of casing 61 and the outer supporting rib 77 of support 75 and forms a groove or gutter 82. Between the supporting ribs 77 and 78 the filter cloth has relatively little sag and is tightly spanned between the inner supporting rib 78 and the inner rim 64 of the casing 61. A schematically illustrated inlet tube 83 for the wet sludge ends above the gutter 82. The wet sludge may continuously be fed through the inlet tube in adjustable quantity by means of a non-clog pump or a bucket elevator.

Figure 6:
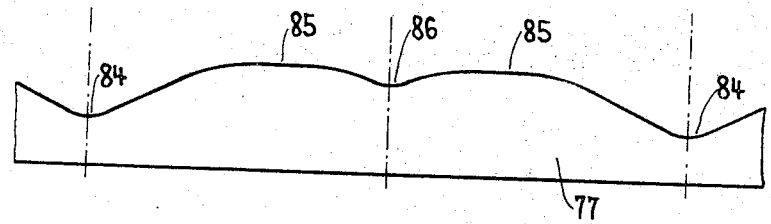
FIGS. 6 and 7 illustrate the shape of supporting ribs.
Figure 7:
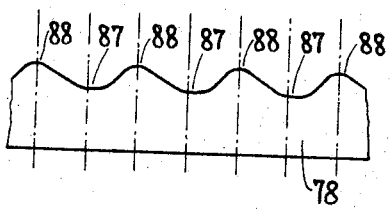
Figure 8:
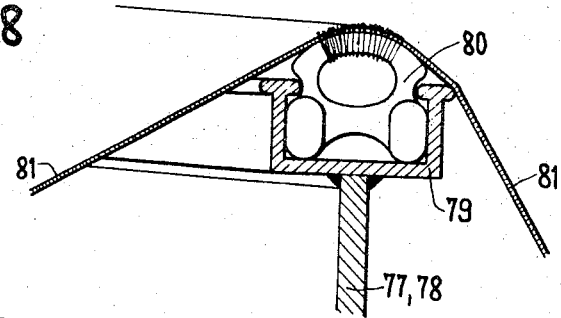
FIG. 8 is a cross section of supporting means for a flat filter element on a support.
Figure 9:
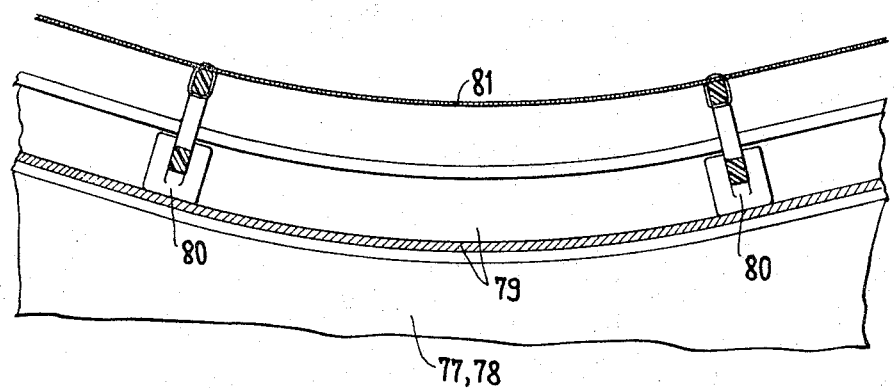
FIG. 9 is a longitudinal section of the supporting means for the filter element.

As shown in FIG. 6 the upper rim of the outer carrying rib 77 has lowest places 84 from where the rim rises approximately symmetrically on each side. The rim has substantially flat or horizontal highest portions 85 with a relatively flat recessed intermediate portion 86. The inner supporting rib 78 has lower portions 87 and higher portions 88 in periodic succession. The number of similar periodically repeated wave shapes of the inner and outer ribs is equal, whereby one wave period from one valley point 84 to the next corresponds to one wave period between two peak points 88 of the inner supporting rib. In other language the wave shapes at the inner and outer supporting rib are phase-shifted by practically one half period whereby the valley points 84 of the outer rib 77 are on the same radius as the peak points 88 of the inner supporting rib 78.

Figure 5:
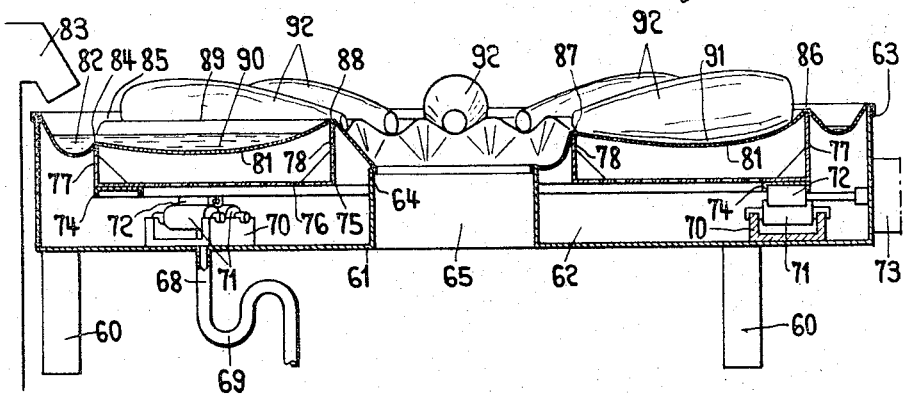
FIG. 5 is a section along line V—V in FIG. 4.

The filter cloth 81 supported on the wave-shaped supporting ribs 77 and 78 generally forms upper ribs or ridges running in straight line between the peak points of the supporting ribs, the filter cloth sagging between such ribs or ridges. Such a ridge formed between two peak points 85 and 88 respectively is shown at 89 in FIG. 5. Of course the peak line of the ridge practically sags somewhat particularly during normal operation of the device when the filter cloth is loaded by a sludge layer. However, the important fact is that recessed portions or valley portions without direct inter-communication are formed between such ribs or ridges. The recessed portions 90 of which one is shown at the left in FIG. 5 communicating with the gutter or groove 82 at the lowest places 84 of the outer supporting rib 77 serve for admitting the wet sludge, and as shown in FIG. 5 such portions are partially filled with a pool of wet sludge. Between the flat recessed portions 86 of the outer supporting rib and the lowest portions 87 of the inner supporting rib 78 the filter cloth equally forms recessed portions extending in substantially radial direction and whereof the outer ends are at a higher level than the inner ends. Such a recessed portion 91 is illustrated on the right in FIG. 5.

For operation of the device, the fan 67 and the motor 73 are first started up. The cylinder 72 rotates the support 75 at the desired speed while the fan 67 produces an underpressure of about 5-6 cm. water in the casing 61 and in the space of the support 75 below the filter cloth 81. The pump or elevator is then started up for admitting wet sludge through the inlet tube 83 into the groove or gutter 82. Since the filter cloth 81 is fixedly attached to the rims 63 and 64 of casing 61 it will not rotate with the support 75 but the latter rotates below the filter cloth whereby the slides 80 are sliding along the guide rails 79 of the supporting ribs 77 and 78. The star-like wave shape of the filter cloth shown in FIGS. 4 and 5 consequently propagates with the support 75 in the rotating direction of the latter, that is, the recessed portions 90 filled with wet sludge from the ring groove or gutter 82 are displaced with the rotating speed of the support 75 so that the pools of wet sludge are rotated at the same speed. For these reasons it is not absolutely necessary that the wet sludge fills the gutter 82 at its full circumference and is fed to the recessed portions 90 at any desired position thereof, because the device will also operate properly when wet sludge is only fed to the recessed portions 90 near the inlet pipe 83, the pools of wet sludge being then moved round the full extension of the annular filter cloth. In any case, recessed portions 90 containing a pool of wet sludge are obtained on the full circumference of the filter cloth during normal continuous operation and a thin layer of wet sludge adheres to the portions of the filter cloth rising behind or downstream such pools relatively to the advancing direction of the pools. These thin layers of wet sludge are rapidly thickened due to the water extraction accelerated by the partial vacuum produced below the filter cloth to such an extent that the sludge layer arriving in the next recessed portion 91 has a consistency suitable for forming a sludge roll 92. As shown in FIG. 5 the axis of such sludge rolls 92 is slightly inclined so that the plastic material of the sludge rolls has the tendency to flow towards the inner end of the roll. The thickened sludge flows or breaks off the inner roll ends over the edges formed at the lowest points 87 of the inner supporting rib 78 and drops through the canal 65. The water extracted from the sludge is drained through pipe 68 whereby the siphon 69 prevents aspiration of air through the drainage pipe 68 into the partially evacuated space 62 of casing 61. As explained above for the sludge pools contained in recessed portions 90, the recessed portions 91 containing the sludge rolls 92 are continuously rotatably displaced by the wave-like movement of the filter cloth so that the sludge rolls continuously roll on the ascending sides of recessed portions 90 and are advanced at the same speed as and synchronously with the sludge pools. The sludge rolls cannot possibly move from one recessed portion 91 to another because they inevitably roll down towards the bottom of such recessed portions whenever they are somewhat lifted towards the ascending side of the recessed portion. Of course, the speed of the wave-like movement and the height and slope of the ridges 89 formed between and separating recessed portions 90 and 91 must properly be designed for preventing sludge rolls 92 from leaving recessed portions 91. Similarly the clear separation of recessed portions 90 and 91 by ridges 89 prevents direct spilling of wet sludge contained in recessed portions 90 into recessed portions 91 containing sludge rolls.

Starting up of the device shown in FIGS. 4 to 9 is very simple. A relatively low flow of wet sludge is initially admitted to the filter cloth and this flow is then gradually increased until the desired consistency of the automatically formed sludge rolls is attained. It is usually not necessary to adjust the rotating speed of support 75 and it is sufficient to adljust the flow of wet sludge.

The fine-mesh filter cloth 81 may be reinforced by a coarser cloth or net disposed below the fine-mesh filter cloth. Since the wave-like movement of the filter cloth is produced by a relative rotation between the casing 61 and the carrier 75, it is possible to obtain the same effects when the support 75 is fixed and the casing 61 is rotated. Instead of an annular filter cloth as shown in FIGS. 4 to 9, an endless tape or band of filter cloth may be provided, this filter band being advanced over driving and return pulleys and the filter cloth being supported on a supporting structure so that recesses are alternately formed in the filter cloth in a direction transversely to its advancing direction for taking up pools of wet sludge and the sludge rolls respectively. The generally flat construction of the embodiment shown in FIGS. 4 and 5, allows a particularly space-saving arrangement of a number of individual devices which may preferably be arranged in storeys on top of each other. The number of sludge rolls formed in one unit of the device shown in FIGS. 4 to 9 may be chosen as desired, whereby one single sludge roll may be produced in a small device.

What I claim is:

1. A method for continuously concentrating or thickening a wet sludge, comprising providing a flexible and water-pervious filter means, supporting said filter means and forming recessed portions in said filter means, feeding wet sludge into at least one recessed portion, producing a wave-like propagating deformation of said recessed portions of the filter means and of the wet sludge contained therein, forming rolls of thickened sludge in at least one recessed portion of the filter means, withdrawing thickened sludge from said rolls and withdrawing filtrate liquid from below said filter means.

2. A method according to claim 1, comprising producing vacuum below the filter means.

3. A device for continuously concentrating or thickening wet sludge, comprising a filter means made of a water pervious, flexible sheet element, a first supporting structure for said sheet element to which the sheet element is fixed and means including a second supporting structure whereon said sheet element is displaceably supported in a manner to form recessed portions, means for producing relative displacement between said second supporting structure and said sheet element, means for producing a wave-like propagation of said recessed portions along said sheet element, means for feeding wet sludge into the recessed portions of the sheet element, outlet means for concentrated sludge from the recessed portions of said sheet element, and outlet means for the filtrate liquid, 4. A device according to claim 3, comprising a ring-shaped filter means.

5. A device according to claim 3, wherein the first supporting structure comprises a stationary supporting structure having circular rim portions forming an annular opening, said filter means covering said opening of the stationary supporting structure, and wherein said second supporting structure comprises a rotatable annular supporting structure concentrically arranged in said annular opening and having two concentric supporting ribs, said filter means being slidably supported on said supporting ribs.

6. A device according to claim 5, wherein the rim portions of said stationary supporting structure are at a constant level while said supporting ribs of the rotatable supporting structure are wave-shaped.

7. A device according to claim 6, wherein the wave-shapes of one supporting rib are staggered in circumferential direction relatively to the wave-shapes of the other supporting rib.

8. A device according to claim 5, comprising slides adapted to slide along the supporting ribs of the rotatable supporting structure, said slides being fixed to the filter means.

9. A device according to claim 8, comprising a sagging portion of the filter means between a rim of the stationary supporting structure and a neighboring supporting rib of the rotatable supporting structure, said sagging portion forming a groove for receiving the wet sludge.

10. A device according to claim 5, comprising inlet means for the wet sludge at the outer rim of the filter means and outlet means for the thickened sludge at the inner rim of the filter means.

11. A device according to claim 5, wherein the rotatable supporting structure is formed by a gutter having apertures in its bottom, and said stationary supporting structure is formed by a casing communicating with means for producing a partial vacuum.

References Cited

UNITED STATES PATENTS

| | | | |
|---|---|---|---|
| 1,917,696 | 7/1933 | Budke | 210—403 X |
| 2,220,324 | 11/1940 | Flynn et al. | 210—205 X |
| 2,295,937 | 9/1942 | Crane et al. | 210—403 |
| 2,454,134 | 11/1948 | Burleson | 210—404 |
| 2,716,494 | 8/1955 | Hursh | 210—396 |
| 2,750,855 | 6/1956 | Lathrop | 210—403 X |
| 2,798,424 | 7/1957 | Smith et al. | 210—396 X |
| 2,798,609 | 7/1957 | Smith et al. | 210—77 X |
| 3,080,063 | 3/1963 | Krynski et al. | 210—344 X |
| 3,117,927 | 1/1964 | Smith | 210—403 X |
| 3,273,494 | 9/1966 | Cocchiarella | 210—326 X |

REUBEN FRIEDMAN, *Primary Examiner.*

J. L. DE CESARE, *Assistant Examiner.*